United States Patent [19]
Kikuchi

[11] Patent Number: 5,980,985
[45] Date of Patent: Nov. 9, 1999

[54] METHOD AND APPARATUS FOR FORMING PROTECTIVE FILM

[75] Inventor: Minoru Kikuchi, Miyagi, Japan

[73] Assignee: Sony Corporation, Tokyo, Japan

[21] Appl. No.: 09/038,944

[22] Filed: Mar. 12, 1998

[30] Foreign Application Priority Data

Mar. 12, 1997 [JP] Japan ..................................... 9-058034

[51] Int. Cl.[6] ...................................................... B05D 1/00
[52] U.S. Cl. .......................... 427/240; 427/127; 427/162; 118/52; 118/56; 118/319; 118/320; 118/500; 118/503; 118/504; 118/505
[58] Field of Search ............................... 118/52, 56, 500, 118/503, 319, 320, 504, 505; 427/240, 127, 162

[56] References Cited

U.S. PATENT DOCUMENTS 5,199,988  4/1993  Kamezakie et al. ....................... 118/52

*Primary Examiner*—Laura Edwards
*Attorney, Agent, or Firm*—Hill & Simpson

[57] ABSTRACT

The present invention provides an apparatus and method for forming a protective film on a disc-shaped recording medium including providing a turntable having a center aperture, setting the disc-shaped recording medium having a center opening on the turntable with the center opening being aligned with the center aperture, covering at least the center opening of the disc-shaped recording medium with a rotating disc having a portion larger in diameter than the center opening of the disc-shaped recording medium, and supplying a protective film material to the center of the rotating disc and simultaneously rotating the turntable, the disc-shaped recording medium, and the disc to cause an outward radial flow of the protective film material off the disc and onto the disc-shaped recording medium so that the protective film is obtained and has a thickness with a small variation.

5 Claims, 9 Drawing Sheets

METHOD AND APPARATUS FOR FORMING PROTECTIVE FILM

BACKGROUND OF THE INVENTION

1. Field of the Invention

This invention relates to a method and apparatus for forming a protective film on a disc-shaped recording medium.

2. Description of the Related Art

The photomagnetic recording system is such a recording system in which a recording layer formed of a magnetic material is partially raised in its temperature to higher than the Curie point or a temperature compensation point to reduce the coercivity, and in which a recording magnetic field is applied from outside for inverting the direction of magnetization of the recording layer to record information signals. This photomagnetic recording system is put to practical use in an optical filing system, an external storage device for a computer or in a device for recording the audio or video information.

The magneto-optical disc for recording by the above-described photomagnetic recording system may be exemplified by a magneto-optical disc having a recording layer of a thin magnetic film formed on a transparent substrate including plastics, such as polycarbonate, or glass. This recording layer is made up of a magnetic layer for recording information signals thereon, a dielectric film and a recording layer. The magnetic film is a thin magnetic film made up of, for example, a rare earth-transition metal alloy amorphous thin film having an easy axis perpendicular to the film surface and a large photomagnetic effect. On the reflective film, layered on the uppermost layer of the recording layer, a protective film formed of an ultra-violet ray curable resin, is usually deposited for preventing corrosion or damage to the recording layer.

As the magneto-optical disc, there is also a magneto-optical disc of a double-plate structure, in addition to the above-described single-plate type structure. With the magneto-optical disc of a double-plate structure, two magneto-optical discs are bonded together so that the recording layer sides or the substrate sides face each other. With the magneto-optical disc of the double-plate structure, since signals are recorded independently on the respective recording layers of the discs, the recording capacity is twice that of the magneto-optical disc of the single-plate structure. Moreover, the magneto-optical disc of the double-plate structure is of a symmetrical structure relative to the bonding surface, and hence has a merit that the substrate is less liable to be warped or otherwise deformed against changes in temperature or humidity than the magneto-optical disc of the single-plate structure.

The photomagnetic recording system for recording on the magneto-optical disc is roughly classified into an optical modulation system of recording signals by modulating the light and a magnetic field modulation system of recording signals by modulating the recording magnetic field.

Of these, the magnetic field modulation system is a system of recording signals on the recording layer by inverting the recording magnetic field at a high speed during signal recording in a state of illuminating the light. Researches in this system are going on energetically since this system enables facilitated overwriting as well as high recording density and high speed accessing.

In this magnetic field modulation system, a magnetic field is applied during signal recording/reproduction by a magnetic head which generates the magnetic field in the recording layer. Since this magnetic head needs to be inverted speedily during signal recording, the magnetic field as strong as that of the above-described optical modulation system cannot be generated.

The magnitude of the magnetic field applied to the magneto-optical disc by the magnetic head is inversely proportionate to the distance between the magneto-optical disc and the magnetic head. That is, the magnitude of the magnetic field applied to the magneto-optical disc becomes smaller as the distance between the magneto-optical disc and the magnetic head becomes larger. Therefore, with the magnetic head, the distance between it and the magneto-optical disc needs to be reduced in effecting signal recording.

With the magneto-optical disc of the single-plate structure, this problem is addressed by providing an optical pickup device for illuminating the laser light on one surface of the magneto-optical disc and by providing the magnetic head on the opposite surface of the magneto-optical disc.

For recording/reproducing the magneto-optical disc of the double-plate structure, the optical pickup device is unified with the magnetic head and the optical pickup device and the magnetic head thus unified together are arranged on both sides of the magneto-optical disc.

With this unified optical pickup device—magnetic head system, the laser light is directly illuminated on the recording layer, without interposition of the substrate. Thus, the material of the substrate of the magneto-optical disc may be opaque without having to be transparent.

Therefore, the magneto-optical disc of the double-plate structure has an additional merit that Al, for example, may be used as the substrate material to prevent the substrate from warping. The magneto-optical disc may be classified into the single-plate structure and the double-plate structure. On these magneto-optical discs, protective films are usually formed for preventing corrosion of the recording layer. This protective film is usually formed by the spin coating method.

For forming the protective film, a disc substrate 20, having the protective film formed thereon, is set on the turntable, and rotated at a reduced speed by a spindle motor. A UV curable resin 21 is supplied in a toroidal pattern along an inner peripheral area 20a of the recording layer of the disc substrate 20. The UV curable resin 21 is applied up to the outer rim by the centrifugal force produced by rotating the disc substrate 20 at an elevated speed for coating the entire surface of the disc substrate 20 with the UV curable resin 21. For obtaining a sufficient protective effect after illumination of the UV rays during the subsequent step, this thickness of the protective film is formed to approximately 15 $\mu$m.

However, the protective film, formed by supplying the UV curable resin 21 from the inner rim 20a of the disc substrate 20 as described above, tends to be thicker in film thickness as the outer rim if the disc substrate 20 is approached.

However, the protective film formed by the spin coating is varied with viscosity of the UV curable resin, rpm of the magneto-optical disc or the rotating time. However, if the protective film is applied from the inner rim 20a of the disc substrate 20 and the rotating velocity as well as the rotating time is changed for coating the entire surface of the disc substrate to a uniform film thickness, the disc substrate becomes thicker in film thickness at an outer rim than at the inner rim 20a of the disc substrate 20.

FIG. 2 shows the film thickness distribution when the protective film is formed with the viscosity of the UV curable resin being varied from 500 cps through 140 to 37 cps. In FIG. 2, the ordinate and the abscissa denote the film thickness of the protective film and the radial position on the disc substrate 20, respectively. Also, in FIG. 2, characteristics A denote the relation between the film thickness of a protective film formed by a UV curable resin of 500 cps in viscosity and the radial position on the disc substrate 20, while characteristics B and C denote the relation between the film thickness of a protective film formed by a UV curable resin of 140 cps in viscosity and the radial position on the disc substrate 20 and that between the film thickness of a protective film formed by a UV curable resin of 37 cps in viscosity and the radial position on the magneto-optical disc, respectively.

In measuring the relation between the film thickness and the radial position on the disc substrate, shown in FIG. 2, the UV curable resin was supplied in a toroidal pattern at a radial position of approximately 17 mm from the center of the disc substrate 20 rotated at a low speed, the number of revolutions was raised over about 1 second up to approximately 3000 rpm which was kept for approximately 8 seconds, and the UV rays were illuminated to form a protective film, which was the object of measurement. In FIG. 2, a solid line indicates calculated values of the film thickness distribution as found from an equilibrium equation between viscous resistance and the centrifugal force.

In a known manner, the film thickness of the protective film formed by coating the UV curable resin of different viscosities under the same conditions is proportionate to the square root of viscosity. Thus, if a UV curable resin of 140 cps in viscosity and another UV curable resin 500 cps in viscosity are coated under the same conditions, the ratio of film thicknesses of the two films is theoretically $(500/140)^{1/2}=1.9$. On the other hand, if a UV curable resin of 37 cps in viscosity and another UV curable resin 500 cps in viscosity are coated under the same conditions, the ratio of film thicknesses of the two films is theoretically $(500/37)^{1/2}=3.7$.

Based on the above-described film thickness ratio, a first normalized film thickness distribution was found by multiplying the film thickness distribution of the protective film, formed by the UV curable resin of 140 cps in viscosity, with 1.9. Similarly, a second normalized film thickness distribution was found by multiplying the film thickness distribution of the protective film, formed by the UV curable resin of 37 cps in viscosity, with 3.7. These two distributions are shown in FIG. 3 along with the film thickness distribution of the protective film formed by the UV curable resin of 500 cps in viscosity. In FIG. 3, the film thickness distribution of the protective film for 500 cps of viscosity is indicated by ○, while the first normalized film thickness distribution and the second normalized film thickness distribution are indicated by △ and □, respectively.

In FIG. 3, the first film thickness distribution, second film thickness distribution and the film thickness distribution of the protective film formed by the UV curable resin with the viscosity of 500 cps are substantially on the same curve. Thus it is seen that the film thickness of a protective film is proportionate to the square root of the viscosity on the condition that the same condition is used.

It is also seen from FIG. 3 that if, with the conventional spin coating method used for forming the protective coating, a protective film is to be formed to a pre-set film thickness, film thickness errors of a pre-set value are produced between the film thicknesses formed at an inner rim 20a and at an outer rim of the disc substrate 20, even though operating conditions, such as rotating time and rotating velocity, are varied.

It should be noted that the film thickness difference at the inner and outer rims of the disc substrate can be reduced by using a UV curable resin of low viscosity, increasing the rotating time of the disc substrate 20 and by reducing the film thickness of the coated UV curable resin over the entire surface of the disc substrate 20. For example, by using the UV curable resin of 37 cps in viscosity, lengthening the rotating time and reducing the entire film thickness of the protective film, the film thickness difference of the order of 1.5 μm can be realized between the positions of 24 mm and 40 mm from the center of the magneto-optical disc.

However, if the film thickness is drastically reduced, it becomes impossible to prevent corrosion of the recording layer of the magneto-optical disc. Therefore, the film thickness of the order of 15 μm on an average is required at the minimum over the entire surface of the magneto-optical disc. If the average film thickness of the protective film on the entire surface of the magneto-optical disc is set to approximately 15 μm, the film thickness difference of approximately 5 μm is produced between the inner and outer rims of the disc.

Meanwhile, if, in an optical pickup device adapted for recording/reproducing signals by illuminating the laser light from the side of the protective film, a film thickness difference of the protective film is produced between the inner and outer rims of the disc substrate 20, there is presented a problem that the laser light is subjected to wavefront aberration. If, in the optical pickup device, the wavefront aberration is produced due to the film thickness difference of the protective film, the illuminated laser light becomes unstable to affect the recording/reproducing characteristics. This wavefront aberration $W_{40d}$ is given by the equation (1):

$$W_{40d} = \frac{n^2-1}{8n^3}(NA)^4 \Delta d \qquad (1)$$

where n is the refractive index of the protective film, Δd is the film thickness distribution of the protective film and NA is the numerical aperture of the lens.

In the case of the current magneto-optical disc, the refractive index n of the protective film is 1.58, the wavelength λ of the length of the optical system is 780 nm and the numerical aperture NA is 0.5. Under these conditions, if the film thickness error Δd is 5 μm, the wavefront aberration $W_{40d}$ is calculated from the equation (1) to be 0.19 λ (0.148 μm).

Meanwhile, in the optical system of the magneto-optical disc, the wavelength λ of the laser light of the optical system is shortened, whereas the numerical aperture NA of the lens is increased, in keeping up with the recent tendency towards using a higher recording density. This is due to the fact that the spot diameter of the laser light condensed by the objective lens is proportionate to the wavelength λ of the laser light and inversely proportionate to the numerical aperture NA of the lens. If, with the current laser spot diameter of approximately 1.6 μm, the wavelength of the laser light is 480 nm and the numerical aperture NA of the lens is 0.9, the laser spot diameter is 0.5 μm, so that the laser spot diameter can be made equal to approximately one-third the current value. Therefore, with this optical system, the surface recording density can be made equal to approximately 9 times the currently valid surface recording density.

However, if, in case the optical system is modified for improving the recording density as described above, a film thickness error of the order of 5 μm is produced in the protective film formed by a protective film generating device as described above, the wavefront aberration $W_{40d}$ calculated by the above equation (1) assumes a large value to render it difficult to achieve stable recording/reproduction. If the wavelength λ of the laser light is 480 nm and the numerical aperture NA is 0.9, the wavefront aberration $W_{40d}$ becomes very large to render it impossible to effect stable recording/reproduction. For suppressing the wavefront aberration $W_{40d}$ in the optical system of the magneto-optical disc to a value of the order of 0.19 λ equal to the currently adopted value, the film thickness difference Δd between the inner and outer rims of the protective film needs to be suppressed to not larger than 2.9 μm.

The above-described film thickness difference of the protective film affects not only the illumination of the laser light by the above-described optical system, but also the application of the magnetic field by the magnetic head. The magnetic head used with the above-described magnetic field modulation system may be enumerated by a magnetic head adapted for recording signals with a small gap of the order of several to tens of micrometers from the protective film of the magneto-optical disc and a magnetic head adapted for recording signals as it has a sliding contact with the protective film of the magneto-optical disc. If, in the magnetic field modulation system employing the magnetic head, the protective film undergoes the film thickness difference, the separation between the magnetic head and the magneto-optical disc is changed. This means that, if there is the film thickness difference in the protective film in the magnetic field modulation system, the strength of the magnetic field undergoes fluctuations to reflect this film thickness difference. The result is that the strength of the magnetic field applied to the recording layer undergoes fluctuations. That is, if there is the film thickness difference in the protective film, the magnetic field applied to the recording layer is varied in magnitude during recording of the information signals to render the magnetic field applied across the entire surface of the magneto-optical disc non-uniform. If the amount of float of the magnetic head during signal recording is 5 μm, and the film thickness of the protective film is thicker by 5 μm at the outer rim portion than that at the inner rim portion, the magnitude of the magnetic field applied to the magnetic field applied to the recording layer differs by approximately 15 Oe between the inner and outer rim portions of the disc.

Among the methods of suppressing the above-described film thickness difference of the protective film, there is such a method in which, while the magneto-optical disc is rotated at a rpm exceeding 1000, an ultraviolet beam is illuminated on the disc for forming the protective film. However, if the protective film is formed in this manner, a film thickness difference is produced between the inner rim 20a and the outer rim of the disc substrate 20, with the film thickness becoming larger at the outer rim portion. This film thickness difference is produced by application of the viscous resistance and the centrifugal force to the UV curable resin by rotation of the disc substrate 20 during spin coating. This UV curable resin, supplied to the inner rim 20a of the disc substrate 20, migrates towards its outer rim portion. If the UV light is illuminated from the outer rim towards the inner rim 20a of the disc substrate 20, the resin is cured at the outer rim portion. However, at the inner rim portion 20a not illuminated with the UV light, the resin migrates towards the outer rim portion under the centrifugal force so that it is gradually decreased in thickness. The outer rim of the disc, where the resin is cured on irradiation with the UV light, is gradually increased in thickness because the UV curable resin 21 is supplied from the inner rim 20a where it is not yet cured. Thus, the film thickness difference between the inner and outer rims of the magneto-optical disc becomes larger than if the resin is cured without rotating the magneto-optical disc.

SUMMARY OF THE INVENTION

It is therefore an object of the present invention to provide a method and apparatus for forming a protective film in which a protective film is formed to a pre-set uniform film thickness on the substrate in its entirety.

In one aspect, the present invention provides a protective film forming apparatus for supplying a resin to a disc-shaped recording medium for coating the resin on an entire surface of the disc-shaped recording medium by rotating the disc-shaped recording medium, including a turntable on which the disc-shaped recording medium having a center aperture is set and which is adapted for rotating the disc-shaped recording medium, and a rotating disc having a center shaft inserted into a center aperture formed at a mid portion of the turntable and a disc portion adapted for covering at least the center aperture of the disc-shaped recording medium.

Preferably, the disc portion has a taper gradually increasing in thickness from the outer rim towards the inner rim.

Also preferably, a material smaller in surface tension than the resin for the protective film of the disc-shaped recording medium is arranged on a contact surface of the disc portion with the disc-shaped recording medium.

If the disc-shaped recording medium has an annular groove radially inwardly of a data area in which to record information signals, the diameter of the disc portion of the rotating disc is larger than the diameter of said groove.

With this protective film forming device, including a rotating disc having a center shaft inserted into a center aperture of the turntable and a disc portion covering the inner rim of the disc-shaped recording medium, the center aperture of the disc-shaped recording medium can be stopped so that the resin can be furnished from the center of rotation of the disc-shaped recording medium.

In another aspect, the present invention provides a method for forming a protective film on a disc-shaped recording medium including setting a disc-shaped recording medium having a center aperture on a turntable, covering at least the center aperture of the disc-shaped recording medium by a rotating disc having a disc portion larger in diameter than the center aperture of the disc-shaped recording medium, supplying a protective film material to the center of the rotating disc and simultaneously rotationally driving the disc-shaped recording medium and the rotating disc for spreading the protective film material for forming a protective film on the disc-shaped recording medium.

With this protective film forming method, at least the center aperture of the disc-shaped recording medium is covered by a rotating disc having a disc portion larger in diameter than the center aperture of the disc-shaped recording medium, and a protective film material is furnished to the center of the rotating disc, so that the resin can be furnished from substantially the center of the disc-shaped recording medium to form the protective film.

DESCRIPTION OF PREFERRED EMBODIMENTS

Figure 1:
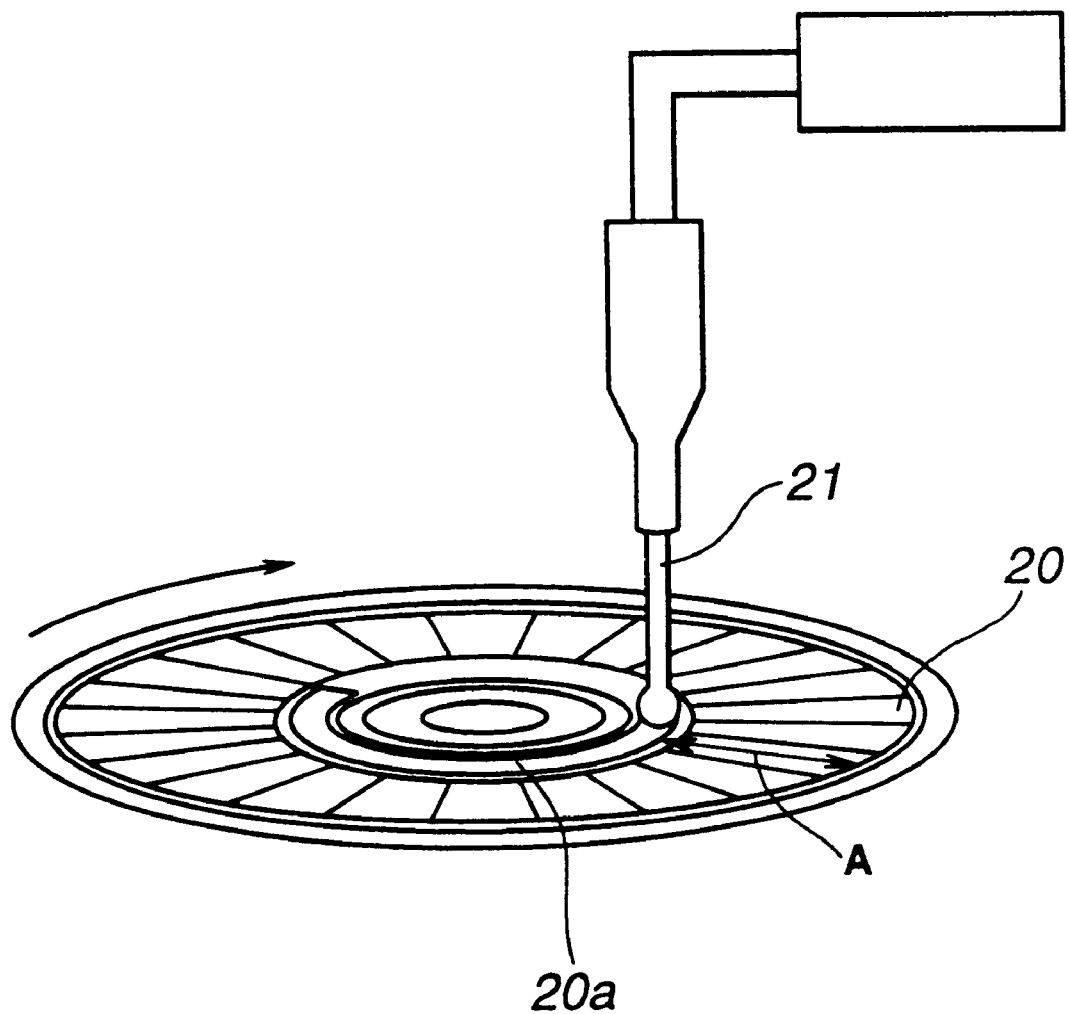
FIG. 1 is a perspective view showing the state of forming a protective film by a conventional protective film forming device.
Figure 2:
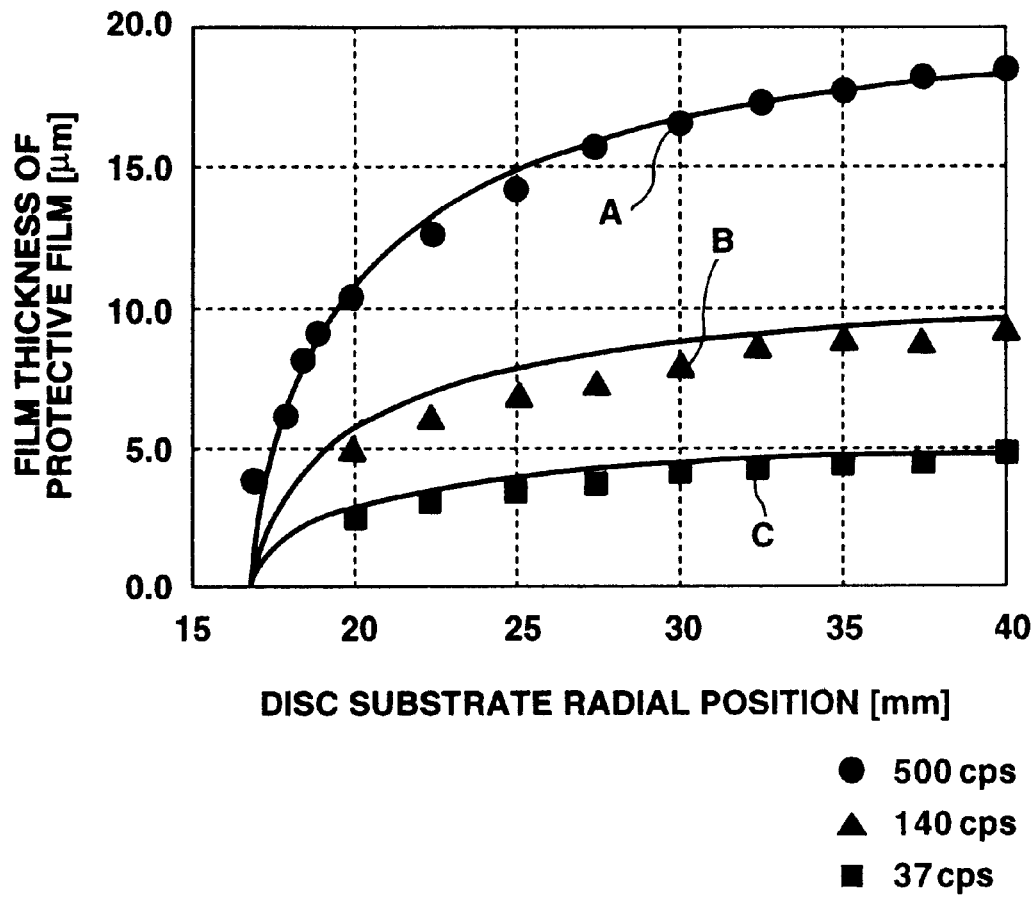
FIG. 2 shows the relation between the radial position on a disc substrate and the film thickness of the protective film when the conventional protective film forming device for a magneto-optical disc is used and the viscosity is varied.
Figure 3:
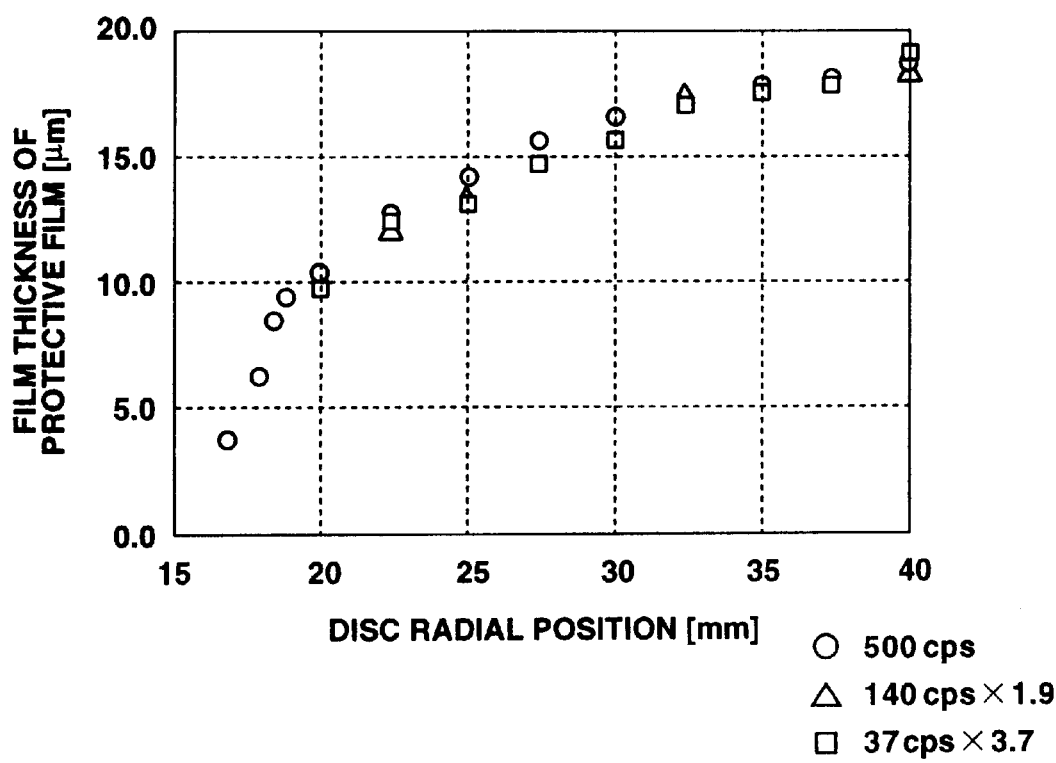
FIG. 3 shows the relation between the disc substrate and the protective film with the use of the conventional protective film forming device.
Figure 4:
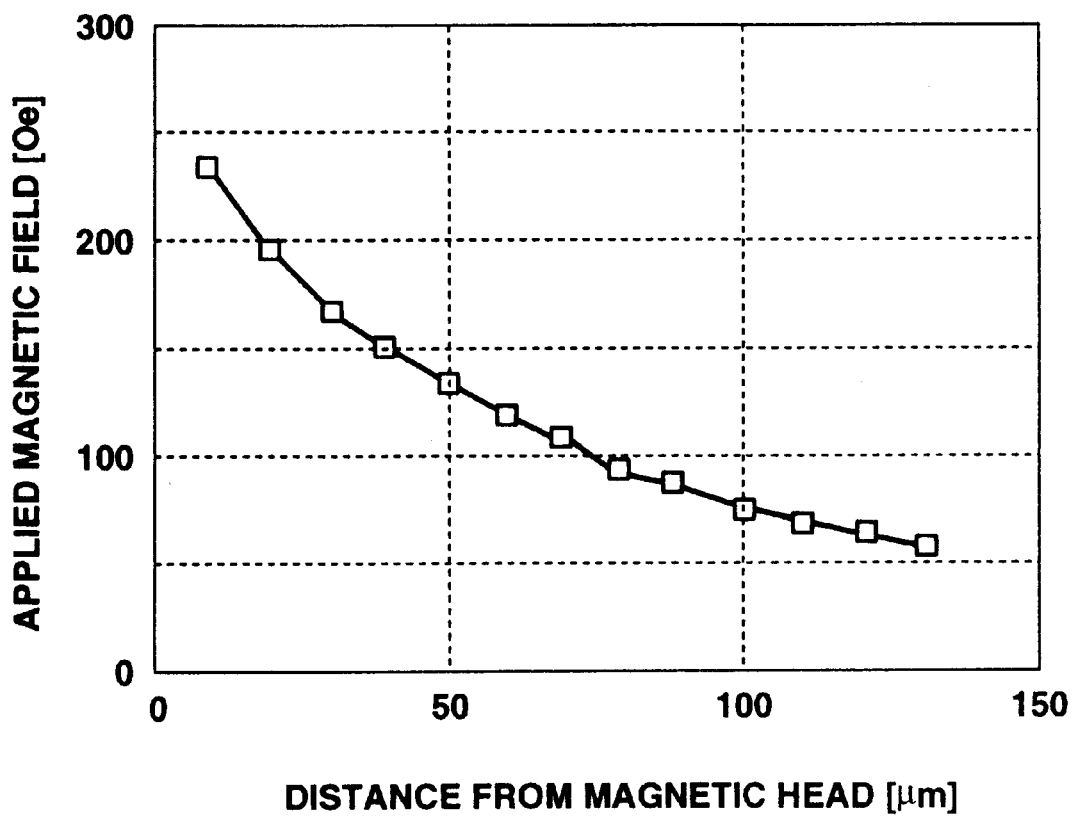
FIG. 4 shows the relation between the distance between the magnetic head and the magneto-optical disc and the magnetic field applied to the magneto-optical disc.
Figure 5:
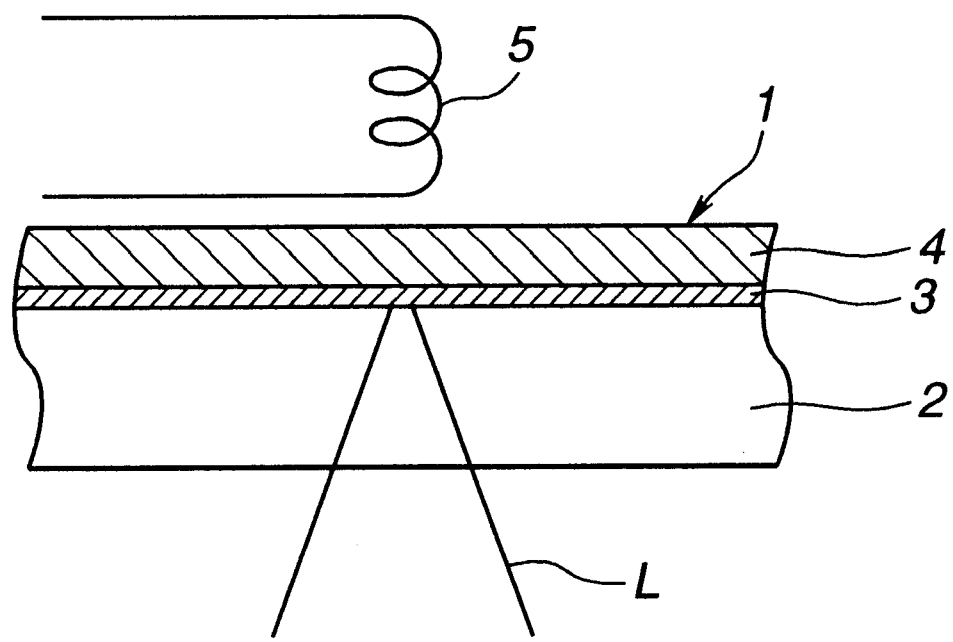
FIG. 5 is a cross-sectional view showing an example of a recording/reproducing apparatus for a magneto-optical disc.

Referring to the drawings, preferred embodiments of a method and apparatus for forming a protective film according to the present invention will be explained in detail.

A magneto-optical disc 1, on which a protective film is formed by a protective film forming device, now to be explained, is such a magneto-optical disc for which recording/reproduction is preformed in accordance with the so-called magnetic field modulation system and which is comprised of a recording layer 3 formed on a disc substrate 2 and a protective film 4 formed on the recording layer 3. During recording/reproduction, an optical pickup device and a magnetic head are placed on the side of the disc substrate 2 and on the side of the protective film 4, respectively. During recording, a laser light beam L is illuminated on the magneto-optical of the disc 1 by the optical pickup device from the side of the disc substrate 2, while a magnetic field is applied at a high frequency from the side protective film 4 by the magnetic head 5 on the disc for recording information signals thereon.

This magneto-optical disc 1 is made up of a disc substrate 2 formed of a synthetic resin material, a recording layer 3 layered on this disc substrate 2 and which is adapted for recording information signals thereon, and a protective film 4 layered on this disc substrate and which is adapted for protecting the recording layer 3.

The disc substrate 2 is a disc-shaped transparent substrate and is formed of plastics, such as acrylic resin, polycarbonate resin, polyolefin resin or epoxy resin, or a glass material.

The recording layer 3 is formed on the disc substrate 2 in a toroidal pattern over a radial extent of approximately 24 to 40 mm from the center of the disc substrate 2. This recording layer 3 is made up of a first dielectric film, a recording magnetic film for recording information signals thereon, a second dielectric film and a reflective film, which are all layered together.

The recording magnetic film is formed of an amorphous thin magnetic film having an easy axis perpendicular to the film surface. This recording magnetic film is superior in photomagnetic properties and has a large coercive force at room temperature and a Curie point at approximately 200° C. This recording magnetic film is constituted by a rare earth-transition metal amorphous thin film, such as a TbFeCo-based amorphous thin film. For improving corrosion resistance, Cr or the like elements may also be added to this recording magnetic film.

The first and second dielectric films may be formed of oxides or nitrides. It is preferred to use nitrides since oxygen in the dielectric film tends to affect the recording magnetic film, and it is preferred to use silicon nitride or aluminum nitride since these compounds are effective in preventing permeation of the moisture or in assisting transmission of the laser light.

The reflective film is preferably formed of a high reflectance film capable of reflecting the laser light in an amount exceeding 70% at a boundary to the second dielectric film. An evaporated film of nonmagnetic metal is preferred. This reflective film is preferably formed of aluminum which is procurable readily.

The recording magnetic film, first and second dielectric films and the reflecting film are formed by a so-called gaseous phase plating method, such as vapor deposition or sputtering. The film thicknesses of the various films that make up the recording layer 3 are usually set to tens to hundreds of nanometers depending not only on optical properties of the respective layers but also on the effects of combination of the different films in consideration that effective optical properties and photomagnetic properties of the recording magnetic films are fluctuated under the effect of multiple interference of light beams transmitted through the recording magnetic layers and reflected by the interfaces of the respective layers in dependence upon the thicknesses of the respective films. The protective film 4 is formed on the recording layer 3 and is formed of, for example, UV curable resin. The protective film 4 is formed by the spin coating method as later explained. This protective film 4 is formed on the entire surface of the magneto-optical disc 1 to an average film thickness of approximately 15 μm or larger so that the film thickness difference between the inner and outer rim portions of the magneto-optical disc 1 is not larger than approximately 15 μm. By setting the thickness of the protective film 4 as formed on the recording layer 3 of the magneto-optical disc 1 to approximately 15 μm, the recording layer 3 can be prevented from being corroded, while the magneto-optical disc 1 can be prevented from being warped due to changed in temperature.

The protective film forming device 6 for forming the protective film of the magneto-optical disc 1, as described above, furnishes the UV curable resin to the disc substrate 2, carrying the recording layer 3, and rotates the disc substrate 2 to apply the UV curable resin to the entire surface of the disc substrate 2 to form the protective film 4 thereon.

Figure 6:
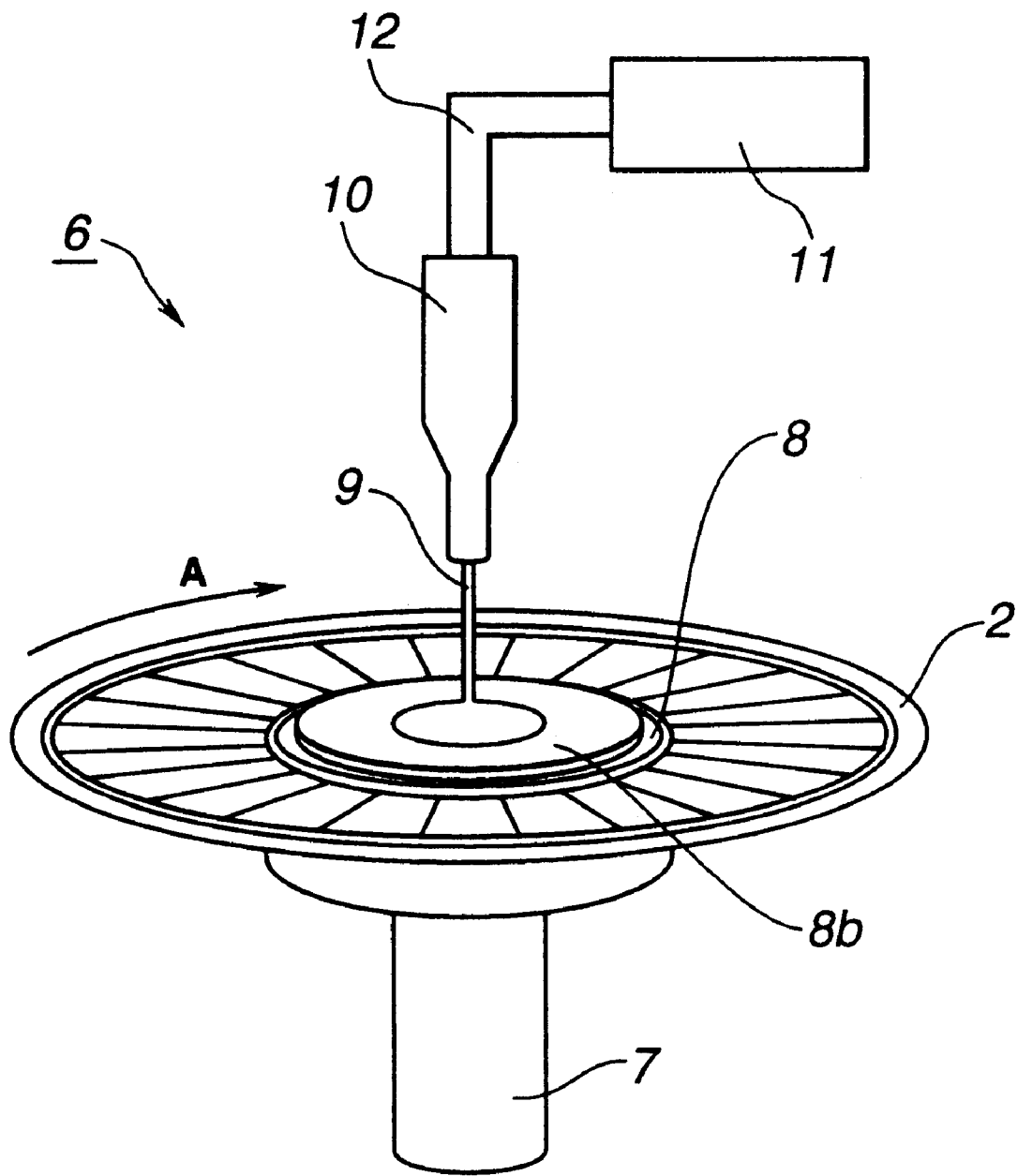
FIG. 6 is a perspective view showing an example of a protective film forming device according to the present invention.
Figure 7:
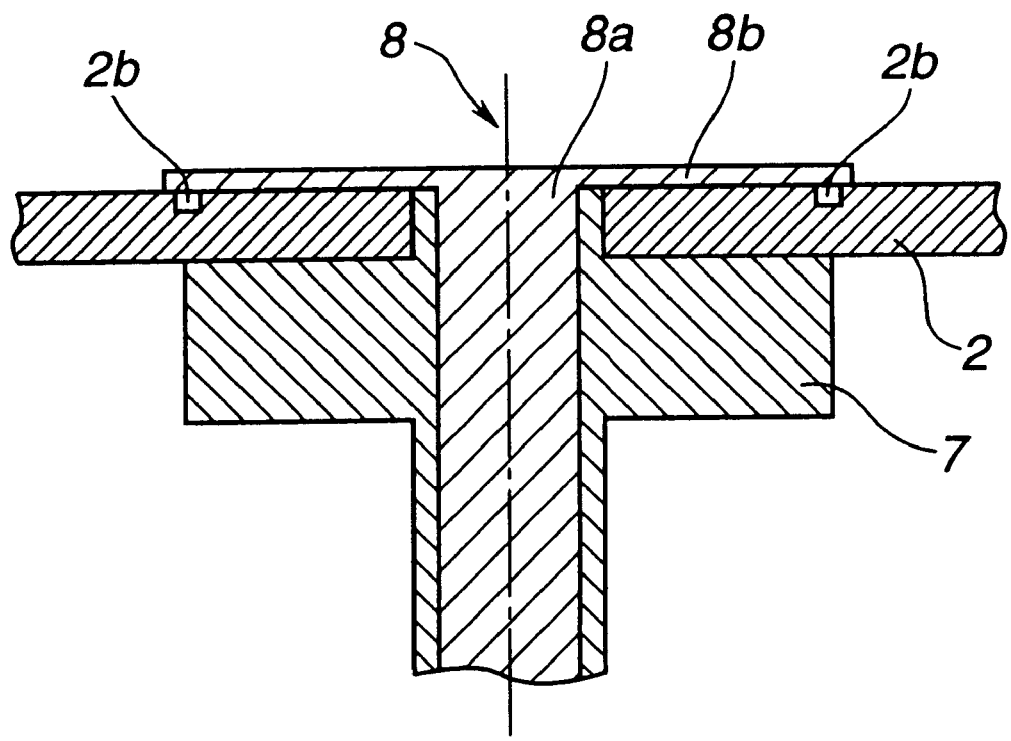
FIG. 7 is a cross-sectional view showing a typical state in which a disc substrate and a rotating disc are set on a turntable.
Figure 8:
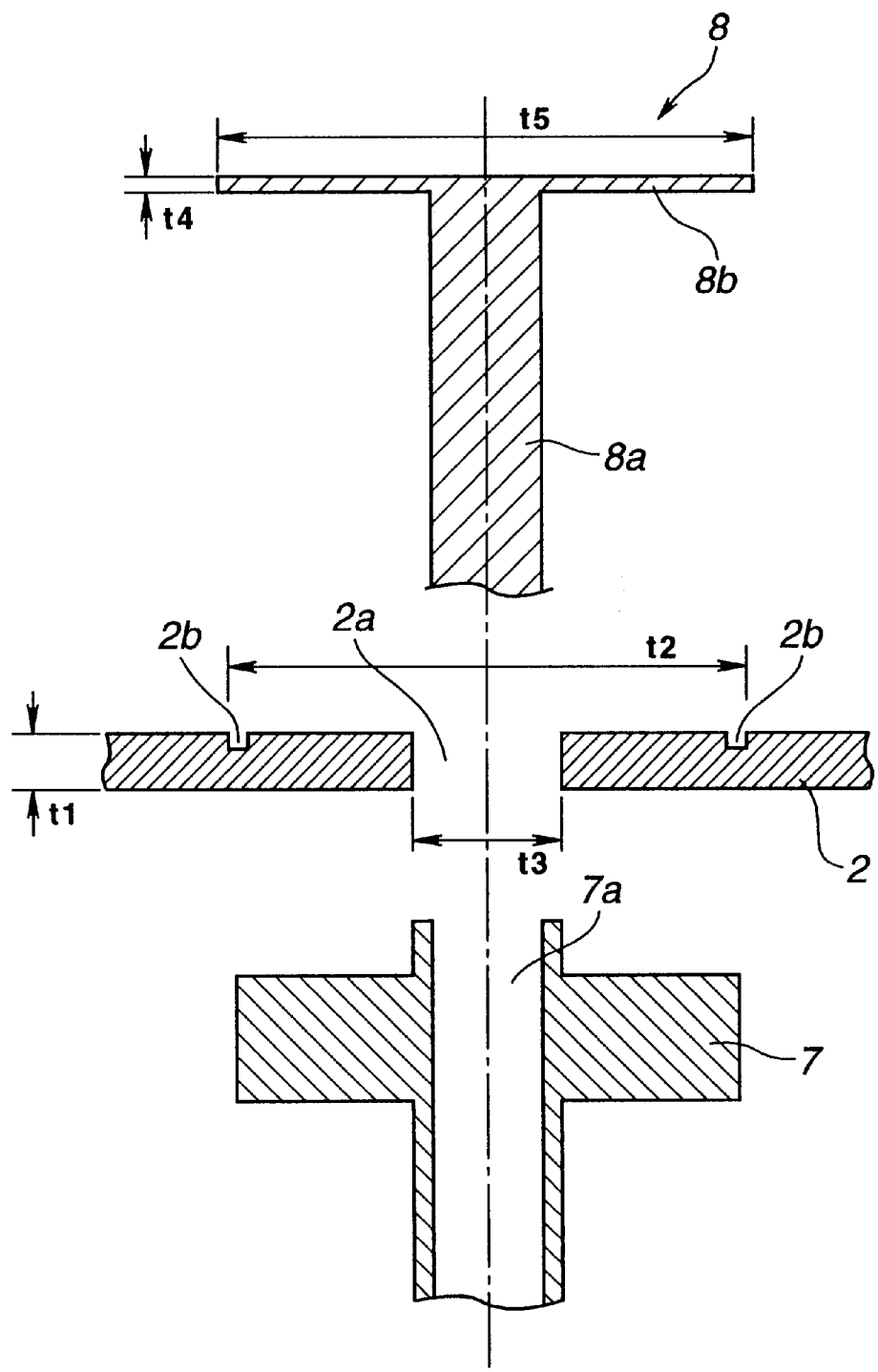
FIG. 8 is an exploded perspective view showing a turntable, a disc substrate and a rotating disc.

Referring to FIGS. 6 to 8, this protective film forming device 6 includes a turntable 7, a rotating disc 8 for closing the center aperture 2a of the disc substrate 2 set on the turntable 7 and a nozzle 10 for supplying the UV curable resin 9 onto the disc substrate 2.

This nozzle 10 is mounted on one end of a resin supply duct 12 connected to a resin supplying portion 11. During spin coating, the nozzle 10 is placed directly above the center of rotation which is the approximate center point of rotation of the disc substrate 2 and the rotating disc 8, for ejecting the UV curable resin 9 onto the center of rotation of the disc substrate 2 and the rotating disc 8.

The turntable 7, on which the disc substrate 2 is set, causes rotation of the disc substrate 2 in the direction of arrow A during spin coating. This turntable 7 runs the disc substrate 2 at a pre-set rpm by rotating driving means, such as a spindle motor. The turntable 7 also has a center aperture 7a into which is fitted a center shaft 8a of the rotating disc 8.

Meanwhile, the disc substrate 2, on which the protective film 4 is formed by the protective film forming device 6 according to the present invention, is such a disc substrate having a thickness t1 of approximately 1.2 mm, an outer diameter of approximately 86 mm, an outer diameter t2 of the groove 2b of approximately 15 mm and a diameter t3 of the center aperture 2a of approximately 15 mm. The groove 2b is formed by e.g., a stamper during substrate formation and is formed radially inwardly of the data area configured for recording the information signals.

The rotating disc 8 is formed of e.g., aluminum and is made up of a disc portion 8b adapted for stopping or closing the center aperture 2a of the disc substrate 2 set on the turntable 7 and for covering the inner rim area of the disc substrate 2. The inner rim area of the disc substrate 2 covered by the disc portion 8b denotes an area of the disc substrate 2 lying inwardly of the data area carrying recorded information signals.

The disc-shaped recording medium has an annular groove 2b radially inwardly of a data area in which to record information signals, as described above. The diameter of the disc portion 8b of the rotating disc 8 is larger than the diameter of the groove 2b. The disc portion 8b is configured for covering an area lying more radially inwardly than a data area in which to record information signals.

This rotating disc 8 is detachable from the center opening 7a of the turntable 7 and, for forming the protective film 4 by the spin coating method, has its center shaft 8a introduced from the surface of the disc substrate 2 formed with the protective film 4 into the center aperture 2a of the disc substrate 2 and the center aperture 7a of the turntable 7. Meanwhile, this rotating disc 8 has a thickness t4 of the disc portion 8b of approximately 0.3 mm and a diameter t5 of the disc portion 8b of approximately 35 mm.

Since the above-described protective film forming device 6 has the rotating disc 8 which is inserted into the center aperture 2a of the disc substrate 2, so that the center aperture 2a of the disc substrate 2 can be stopped so that the UV curable resin 9 may be formed in this state. Thus, with the present protective film forming device 6, the UV curable resin 9 can be supplied from the center of rotation of the disc substrate 2 during spin coating.

With the protective film forming device 6, there is a fear that the UV curable resin 9 is intruded into a space between the surface of the disc portion 8b contacted with the disc substrate 2 and the disc substrate 2. The UV curable resin 9, thus intruded into the space between the disc portion 8b and the disc substrate 2, is affixed to the contact surface of the rotating disc 8 with the disc substrate 2. If the rotating disc 8 is set on the disc substrate 2 when forming the protective film 4 on the disc substrate 2, the inner rim of the disc substrate 2 is contaminated by the UV curable resin 9 affixed to the contact surface of the rotating disc 8 with the disc substrate 2. This is ascribable to the fact that the surface tension of aluminum as the material of the rotating disc 8 is larger than that of the UV curable resin 9. The surface tension of aluminum is approximately 37 dyne/cm, while that of the UV curable resin 9 used in the protective film forming device 6 of the present invention is approximately 30 dyne/cm.

Thus, there is placed a material having a surface tension smaller than that of the UV curable resin 9 on the contact surface of the rotating disc 8 with the disc substrate 2. By arranging this material on the contact surface of the rotating disc 8 with the disc substrate 2, the UV curable resin 9 is less susceptible to wetting, such that, if the UV curable resin 9 is intruded into the space between the rotating disc 8 and the disc substrate 2, there is no risk of the UV curable resin 9 becoming affixed to the rotating disc 8.

Meanwhile, in the protective film forming device 6 according to the present invention, the contact surface of the rotating disc 8 with the disc substrate 2 is teflonated or coated with teflon (polytetrafluroethylene) to set the surface tension of the contact surface of the rotating disc 8 with the disc substrate 2 to approximately 20 dyne/cm which is smaller than the surface tension of the disc substrate 2.

By this teflonation, the contact surface of the rotating disc 8 with the disc substrate 2 has a surface tension which is smaller than that of the UV curable resin 9 of the type usually employed. Since the contact surface of the rotating disc 8 with the disc substrate 2 has a surface tension smaller than that of the UV curable resin 9, it strongly repels the UV curable resin 9 with the surface tension of approximately 25 dyne/cm to 40 dyne/cm to render it difficult for the UV curable resin 9 to enter the space between the contact surface of the disc substrate 2 of the rotating disc 8 and the disc substrate 2.

The inner peripheral surface of the disc substrate 2, on which has been formed the protective film 4 by the protective film forming device 6 as described above, may also be formed with a groove 2b. This groove 2b is formed at a position within the extent of the diameter of the rotating disc 8 of the disc substrate 2 and is formed towards the outer rim side of the inner rim portion of the disc substrate 2. Since the groove 2b is formed towards the outer rim side of the inner rim portion of the disc substrate 2, the UV curable resin 9 can be accumulated if the UV curable resin 9 is intruded into the space between the disc substrate 2 and the rotating disc 8 during spin coating. Thus, the groove 2b helps prevent the inner rim of the disc substrate 2 from being wetted by the UV curable resin 9.

Figure 9:
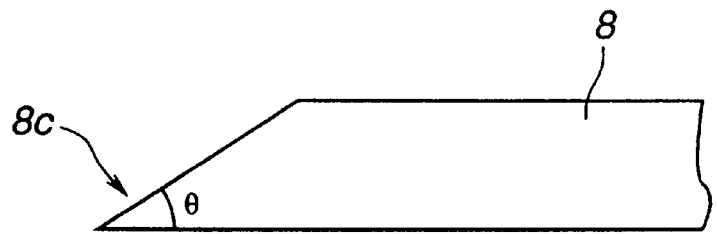
FIG. 9 shows an example of a taper portion formed on the outer rim of a disc portion.

The outer peripheral edge of the disc portion 8b is tapered at 8c, as shown in FIG. 9. This tapered portion 8c has a pre-set angle θ with respect to the protective film forming surface of the disc substrate 2 so that the disc portion 8 will have a thickness increasing gradually from the outer peripheral edge towards the inner rim of the disc portion 8. By the outer peripheral edge of the disc portion 8b having the tapered portion 8c, the UV curable resin 9 supplied during spin coating to the center of rotation of the rotating disc 8 is spread in the radial direction of the disc substrate 2 so that no step difference of the UV curable resin 9 formed in the vicinity of the outer peripheral edge of the disc portion 8b will be formed in the outer peripheral edge of the disc portion 8b.

The method for forming the protective film 4 on the disc substrate 2 by the above-described protective film forming device 6 is hereinafter explained.

In the present protective film forming method, the UV curable resin 9 is supplied from a nozzle 10 towards the center of rotation of the rotating disc 8, as shown in FIG. 6. In the protective film forming method of the present invention, the UV curable resin 9 used has a viscosity of approximately 500 cps. With the disc substrate and the rotating disc 8 set on the turntable 7, the turntable 7 is rotated at an rpm of approximately 30 rpm. This causes the disc substrate 2 and the rotating disc 8 set on the turntable 7 to be rotated at an rpm of approximately 30. Thus, the disc substrate and the rotating disc 8 set on the turntable 7 are rotated at the same velocity as the turntable 7. With the disc substrate 2 and the rotating disc 8 rotated at an rpm of approximately 30, the UV curable resin 9 is applied to the entire surface of the disc substrate 2.

The rpm of the turntable 7 is then increased over about 1 sec to approximately 3000 which is kept for about 8 seconds. By keeping the rpm of approximately 3000 for about 8 seconds, the UV curable resin 9 supplied to the center of rotation of the rotating disc 8 can be spread by the centrifugal force to the outer rim of the disc substrate 2 to apply the resin to the entire surface of the disc substrate 2, that is to the recording layer 3, for producing a coating film of the UV curable resin 9 on the rotating disc 8.

The coating film of the UV curable resin 9 is irradiated with the UV light for curing the resin to form the protective film 4.

Figure 10:
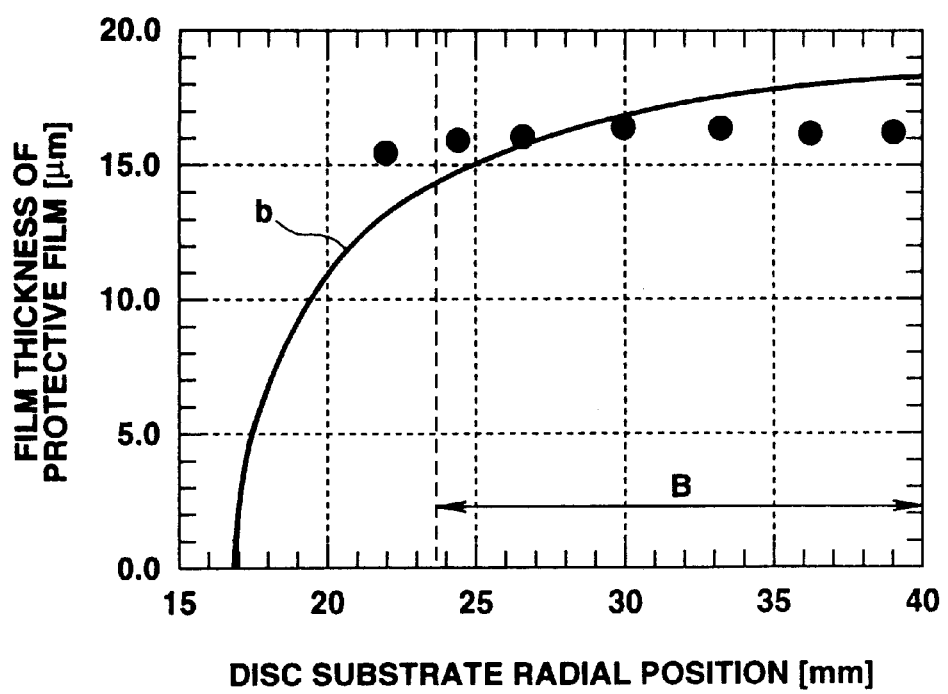
FIG. 10 shows the relation between the radial position of a disc substrate and the film thickness of a protective film.

The protective film 4, thus formed by the above-described protective film forming method for the disc substrate 2, has a film thickness as shown in FIG. 10. In FIG. 10, the abscissa and the ordinate denote the radial position on the disc substrate 2 [mm] and the film thickness [μm] of the protective film 4 on the radial position on the disc substrate 2, respectively. Also, in FIG. 10, the film thickness of the protective film 4 formed by the above-described protective film forming method is indicated by ●, while the corresponding calculated value of the protective film formed on rotating the disc substrate by the conventional method as the comparative example b is indicated by a solid line.

Also, a range B of the recording layer 3 formed on the disc substrate 2 is from approximately 24 mm to approximately 40 mm, as shown in FIG. 10. That is, the range B is the area in which to form the protective film 4.

Referring to FIG. 10, the film thickness of the protective film 4 is approximately 16 μm in a range of from approximately 24 mm to approximately 40 mm of the radial position on the disc substrate 2. In the radial position from approximately 24 mm to approximately 40 mm, the film thickness of the protective film 4 has an error less than approximately 2 μm.

In the comparative example b in FIG. 10, the film thickness tends to be increased from the inner rim towards the outer rim over the entire area of the disc substrate. Also, in the present comparative example b, the protective film 4 is increased in film thickness towards the outer rim of the disc substrate within the range of approximately 24 mm to approximately 40 mm of the radial position on the disc substrate.

Thus, with the above-described protective film forming method, the protective film 4 with a film thickness of not less than approximately 15 μm can be formed within the range B in which the recording layer 3 is formed, at the same time as the protective film 4 thus formed has a film thickness error between the inner and outer rim portions of the disc substrate 2 less than approximately 2 μm.

Since the above-described protective film forming method gives the protective film 4 with the film thickness of not less than 15 μm on the entire surface of the disc substrate 2, the recording layer 3 can be sufficiently protected against corrosion or the like defects.

Since the protective film forming method is designed so that the film thickness error on the entire surface of the disc substrate 2 will be not larger than 2 μm, there is no portion throughout the surface of the disc substrate in which the error in wavefront aberration is increased if the laser light is incident from the side protective film 4. That is, with the use of an optical device which radiates the laser light from the side protective film 4, the protective film 4 is designed so that the film thickness difference is not larger than the upper limit of 2.9 μm which gives the wavefront aberration of not larger than 0.19 λ for the wavelength λ of the laser light of 480 nm and the numerical aperture NA of the lens which permits the laser light to be condensed on the disc substrate 2 of 0.9. That is, with the use of the magneto-optical disc 1 formed with the protective film 4 as described above, there is no risk of the error of wavefront aberration due to film thickness error of the protective film 4 being increased to enable stabilized illumination of the laser light on the recording layer 3 even if the optical system designed for high density recording is used for recording/reproduction.

Also, if, with the present protective film forming method, a magnetic head recording signals as it slides on the magneto-optical disc 1 is used, signals can be recorded without damaging the surface of the magneto-optical disc 1 by the film thickness difference of the protective film 4. Moreover, if, with the present protective film forming method, a magnetic head floated with a small separation from the surface of the magneto-optical disc 1 is used for recording signals, signals can be recorded without the magnetic head being contacted with the surface of the magneto-optical disc 1. If the magnetic head is used in which the spacing between the magneto-optical disc 1 and the magnetic head is set to 5 μm, and the film thickness difference of the protective film 4 on the entire surface of the disc substrate is not larger than 2 μm, the variation of the magnetic field applied by the magnetic head due to the film thickness difference can be suppressed to less than ±4 Oe. Thus, with the protective film forming method, the magnetic field can be applied in stability to the recording layer 3 thus enabling the recording bits to be formed in stability on the entire surface of the magneto-optical disc 1.

Meanwhile, in the above-described protective film forming method and device, any UV curable resin 9 used as a protective film material for the magneto-optical disc, such as acrylic UV curable resin, may be used. Although the UV curable resin 9 having the viscosity of the order of 500 cps is used in the above-described protective film forming method, it is also possible to use such resin modified in viscosity by controlling e.g., the polymerization degree.

The disc substrate 2 provided with the protective film 4 is also not limited to a so-called single-plate structure in which the recording layer 3 and the protective film 4 are formed only on one substrate surface. That is, the disc substrate may also be a double-plate type structure in which substrates of two single-plate magneto-optical discs are bonded together.

With the double-plate structure of the magneto-optical disc, laser light is illuminated from both sides, at the same time as the magnetic field is applied by the magnetic head. That is, the recording layers 3 formed with the protective films 4 are formed on both sides of the disc. With the double-plate structure of the magneto-optical disc, illumination of the laser light and application of the recording magnetic field can be effected in stability by the protective film 4 being formed without film thickness difference between the inner and outer rim portions of the magneto-optical disc.

The above-described protective film forming method and apparatus can be applied not only to the above-described magneto-optical disc but also to a read-only optical disc in which signals are pre-recorded by physical crests and valleys on the disc surface. The present film forming method and apparatus can, of course, be applied to a wide variety of recording mediums, such as magnetic discs, optical discs or phase-transition discs, in which the material for the protective film is coated by the spin coating method for forming the protective film.

Since the protective film forming device includes a rotating disc having a center shaft inserted into a center aperture formed at a mid portion of the turntable and a disc portion adapted for covering at least the center aperture of the disc-shaped recording medium, the resin can be furnished from the center of rotation of the disc-shaped recording medium and the rotating disc during formation of the protective film. Thus, with the present protective film forming device, it is possibly to form a uniform protective film exhibiting no film thickness difference of the protective film between the inner rim and the outer rim of the disc-shaped recording medium.

Also, with the protective film forming method, at least the center aperture of the disc-shaped recording medium is covered by the rotating disc having a diameter larger than the center aperture of the disc-shaped recording medium for supplying the protective film material to the mid portion of the rotating disc, while the disc-shaped recording medium and the rotating disc are rotationally driven for spreading the protective film material for forming the protective film on the disc-shaped recording medium, so that the resin can be furnished from the center of rotation of the disc-shaped recording medium. Thus, with the protective film forming method, the protective film can be formed to a uniform film thickness on the entire surface of the disc-shaped recording medium without the film thickness difference being produced between the inner and outer rims of the disc-shaped recording medium.

What is claimed is:

1. An apparatus for forming a protective film of a resin material on a disc-shaped recording medium, said apparatus comprising a turntable having a center aperture for receiving the disc-shaped recording medium with a center opening of the recording medium aligned with the aperture of the turntable; means for rotating the turntable; a disc having a center shaft inserted through the opening of the disc-shaped recording medium into the center aperture of the turntable, said disc having a disc portion of a diameter greater than the center opening of the recording medium for covering the center opening and a portion of the disc-shaped recording medium adjacent the center opening; and a nozzle connected to a supply of curable resin being positioned over the center of said disc to deposit the resin on the disc to flow radially outward as a resin coating off the disc and onto the disc-shaped recording medium so that the protective film is obtained which has a thickness with a small variation.

2. An apparatus according to claim 1, wherein an outer peripheral edge of the disc is tapered so that the thickness of the disc increases gradually from the outer peripheral edge radially inwardly and, thus, no step differences in the resin coating are formed in the vicinity of the outer peripheral edge of the disc.

3. An apparatus according to claim 1, wherein the disc has a contact surface engaging the recording medium, said contact surface having a material with a smaller surface tension than the surface tension of the resin for the film so that the resin coating does not flow between the contact surface and the recording medium.

4. An apparatus according to claim 3, wherein said material is polytetrafluorethylene.

5. A method for forming a protective film on a disc-shaped recording medium comprising providing a turntable having a center aperture, setting a disc-shaped recording medium having a center opening on the turntable with the opening being aligned with the aperture, covering at least the center opening of the disc-shaped recording medium with a rotating disc having a portion larger in diameter than the center opening of the disc-shaped recording medium, and supplying a protective film material to the center of the rotating disc and simultaneously rotating the turntable, the disc-shaped recording medium, and the disc for spreading the protective film material radially from the disc onto the recording medium to form the protective film on said disc-shaped recording medium.

* * * * *